W. C. TOLLES.
Implement for Shocking Corn.

No. 226,007. Patented Mar. 30, 1880.

Witnesses,
E. A. Perkins.
A. H. B. Lang

Inventor,
Willard C. Tolles,
By Charles B. Tilden
Attorney.

UNITED STATES PATENT OFFICE.

WILLARD C. TOLLES, OF NASHUA, NEW HAMPSHIRE.

IMPLEMENT FOR SHOCKING CORN.

SPECIFICATION forming part of Letters Patent No. 226,007, dated March 30, 1880.

Application filed February 11, 1880.

*To all whom it may concern:*

Be it known that I, WILLARD C. TOLLES, of Nashua, in the county of Hillsborough and State of New Hampshire, have invented certain new and useful Improvements in Implements for Shocking Corn, of which the following is a specification.

My invention consists in a certain device whereby the shocking of corn in harvesting may be greatly facilitated and expedited; and it consists in a rod or stake shod at one end and adapted to be driven into the earth, having two registering-arms pivoted in the same plane at its upper end, with a transverse piece engaging said pivoted arms and holding them extended, while upon the removal of said transverse bar the pivoted arms are allowed to turn freely upon their supports in the manner and for the purpose hereinafter described.

Figure 1:
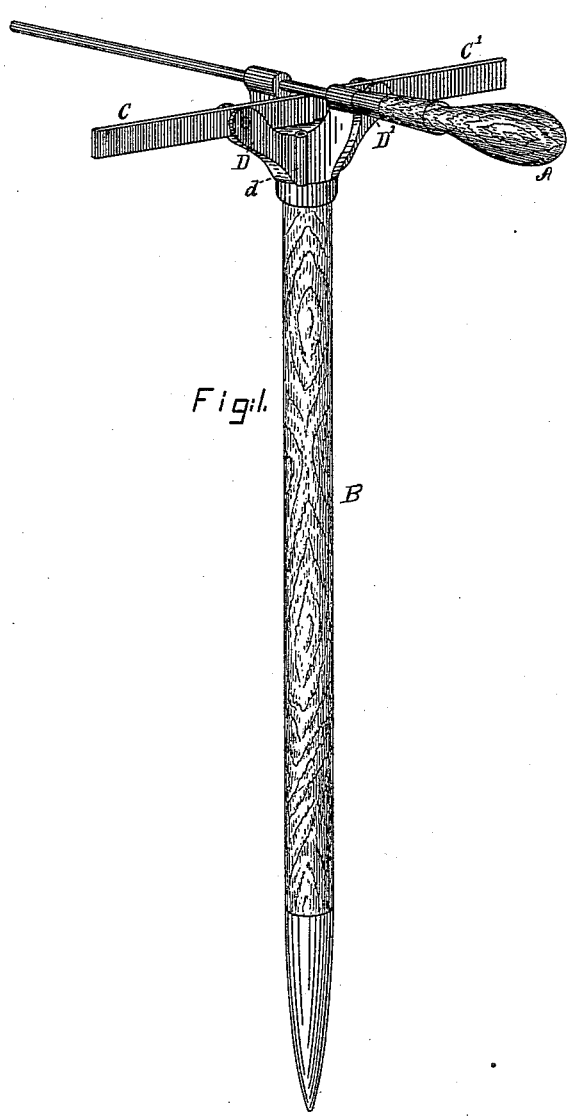
Figure 2:
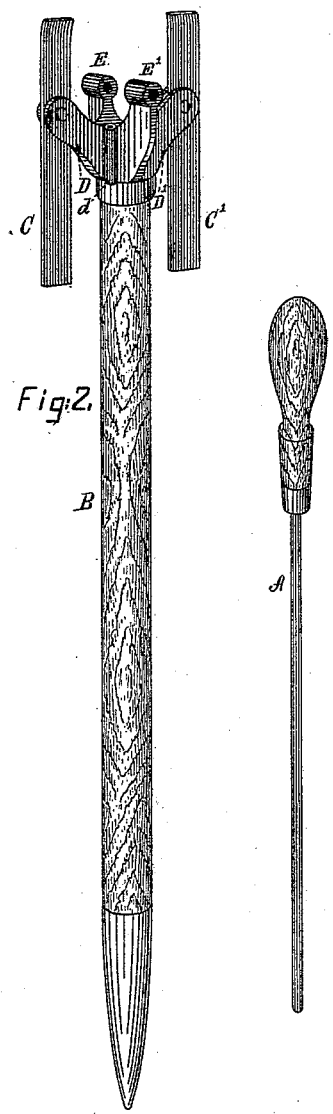

Referring to the drawings forming part of this specification, Figure 1 is a perspective view, showing the parts in position for use. Fig. 2 is a perspective view, showing the transverse piece removed, the latter being shown detached and at the right of said figure.

Heretofore in harvesting corn it has been customary to use various devices for the purpose of forming and binding the cut stalks into shocks. Among others, many farmers have employed a sapling, cutting the branches so as to form a broad fork at the end, the other extremity being sharpened and driven into the ground at such an angle that the fork shall be supported at a height of about three to four feet above the soil. The cut stalks are brought between the forks, their ends resting upon the ground, the body of each stalk being slightly inclined, so as to prevent it from falling. When a sufficient number are collected to form a single shock the tops are bound in the usual manner, the shock is set upright, and the forked support is either removed to another and more convenient point or the stalks are brought to the point where it is driven and the operation repeated.

This contrivance, which is probably the best device in use for the purpose specified, is subject to many objections. It is not always easy to find a sapling suitable for the purpose, and the time required to prepare it, the depth to which it must be driven in the soil in order to give it proper support in an inclined position, and the great difficulty of removing it from point to point as the shocks are successively formed have led me to devise the present invention.

The principal parts of my device are indicated in the drawings by the letters of reference A, B, C, and C'. B is a stake or rod about three feet in length, shod with a sharp point at the lower end, to enable it to be driven into the ground easily. C and C' are two arms, pivoted to forked supports D D' on opposite sides of the stake B. A is a transverse piece, rod, or bar adapted to enter bearings or supports E E', placed on opposite sides of the stake, their plane being at an angle of ninety degrees with the plane in which the arms C C' move. This construction is such that when the arms C C' are raised so as to register with each other, and the transverse piece A is placed in its supports, the latter shall engage with the former and retain them in position for use, as shown in Fig. 1 of the drawings.

The implement being thus adjusted, it is used in the manner following: Upon reaching the spot where it is desired to form a shock of corn the sharp end is driven firmly into the earth by the hand, and the cut stalks are assembled around it, being laid in the four angles formed by the arms C C' and the transverse piece A, the lower ends of the stalks being so placed that they lean somewhat toward the stake as a common center. When a sufficient number are collected and arranged in this manner the tops are bound. The rod A is removed by simply drawing it from its bearings and taking it out between the stalks. This releases the arms C C', as shown in Fig. 2, one of which arms may then be seized by the hand and the whole stake removed, there being no difficulty in withdrawing it from the interior of the shock between the stalks. The transverse piece or rod A may then be slipped into a sleeve, *d*, cast or otherwise formed upon the metal block to which the arms or supports C C' E E' are attached, when the entire apparatus may be carried in the hand to the spot where the next shock is to be formed. Here it is again driven into the soil, the arms are spread, the rod A is inserted in the supports E E', and the shock is formed around it as before.

My invention furnishes an exceedingly simple, cheap, and convenient implement for the purpose described, besides being permanent, strong, and one which no amount of use will get out of order.

Having thus fully described my invention, what I claim as new, and desire to secure by Letters Patent of the United States, is—

1. An implement for shocking corn, consisting of an upright rod or stake adapted to be driven into the earth, and two or more arms, rods, or bars at the upper extremity, placed to form equal angles, one of the number being adapted to be removed after the shock is formed and tied, in order to permit the removal of the entire implement, substantially in the manner and for the purpose set forth.

2. The combination, with the stake or rod B, of the pivoted arms C C' and the transverse rod A, adapted to engage with said pivoted arms, substantially as and for the purpose described.

3. The combination of the stake B, the arms C C', supports D D', the removable rod A, and the supports E E', all as and for the purpose set forth.

4. As a new article of manufacture, an implement for shocking corn, consisting of a straight bar, B, shod at one end, pivoted arms C C', and removable transverse rod A, with a sleeve, d, to receive and retain said rod when not in use, substantially as and for the purpose set forth.

In testimony whereof I have signed my name to this specification in the presence of two subscribing witnesses.

WILLARD C. TOLLES.

Witnesses:
  CHAS. B. TILDEN,
  JOHN A. PARKER.